United States Patent [19]
Lee et al.

[11] Patent Number: 5,944,332
[45] Date of Patent: Aug. 31, 1999

[54] DIRT REMOVING RUNNING BOARD FOR AUTOMOBILE

[76] Inventors: Hsi Sin Lee; Wen Lin Chang, both of 10F, No. 82, Sec.2, WenHua Rd., PanChao, Taipei, Taiwan

[21] Appl. No.: 08/998,957

[22] Filed: Dec. 29, 1997

[51] Int. Cl.⁶ .................................................. B60R 3/00
[52] U.S. Cl. ............................................. 280/163; 280/166
[58] Field of Search ................................ 280/163, 164.2, 280/164.1, 166, 169; 296/50; 182/88, 91, 127

[56] References Cited

U.S. PATENT DOCUMENTS

| | | | |
|---|---|---|---|
| 1,118,584 | 11/1914 | Roebuck | 280/163 |
| 1,792,586 | 2/1931 | Higgins | 280/163 |
| 3,528,573 | 9/1970 | Denner | 280/163 |
| 3,833,240 | 9/1974 | Weiler | 280/166 |
| 4,073,502 | 2/1978 | Frank et al. | 280/166 |
| 4,194,754 | 3/1980 | Hightower | 280/166 |
| 4,813,842 | 3/1989 | Morton | 296/62 |
| 4,846,487 | 7/1989 | Criley | 280/163 |
| 4,982,974 | 1/1991 | Guidry | 280/164.2 |
| 5,028,063 | 7/1991 | Andrews | 280/163 |
| 5,456,479 | 10/1995 | Conger | 280/165 |
| 5,538,265 | 7/1996 | Chen et al. | 280/163 |
| 5,549,312 | 8/1996 | Garvert | 280/166 |
| 5,803,475 | 9/1998 | Dick | 280/163 |
| 5,842,709 | 12/1998 | Maccabee | 280/166 |
| 5,876,051 | 3/1999 | Sage, Sr. | 280/166 |

*Primary Examiner*—Lanna Mai
*Assistant Examiner*—Jeff Restifo
*Attorney, Agent, or Firm*—W. Wayne Liauh

[57] ABSTRACT

A dirt removing running board for automobile includes a cover, a linkage means, a base frame and two steel wires winding to a motor. The linkage means has an upper bar which has a hollow lower portion for housing the upper portion of a lower bar. There is a spring housed in the hollow portion between the upper and lower bars. The lower bar is thus movable up or down to suit different road conditions. The cover is screwed to the chassis of the automobile. The two ends of the linkage means pivotly engage with the cover and base frame respectively to form a substantially Z-shape structure. The motor can release the steel wires to extend the linkage means perpendicular to the cover and the base frame when in use. When the motor rotates in the opposite direction, the steel wires will pull and fold the linkage means and the base frame to the cover for storage. There is a removable dirt removing panel located on the base frame for collecting dirts and muds from the driver and passenger's shoes so that the inside of the automobile may be kept clean.

7 Claims, 8 Drawing Sheets

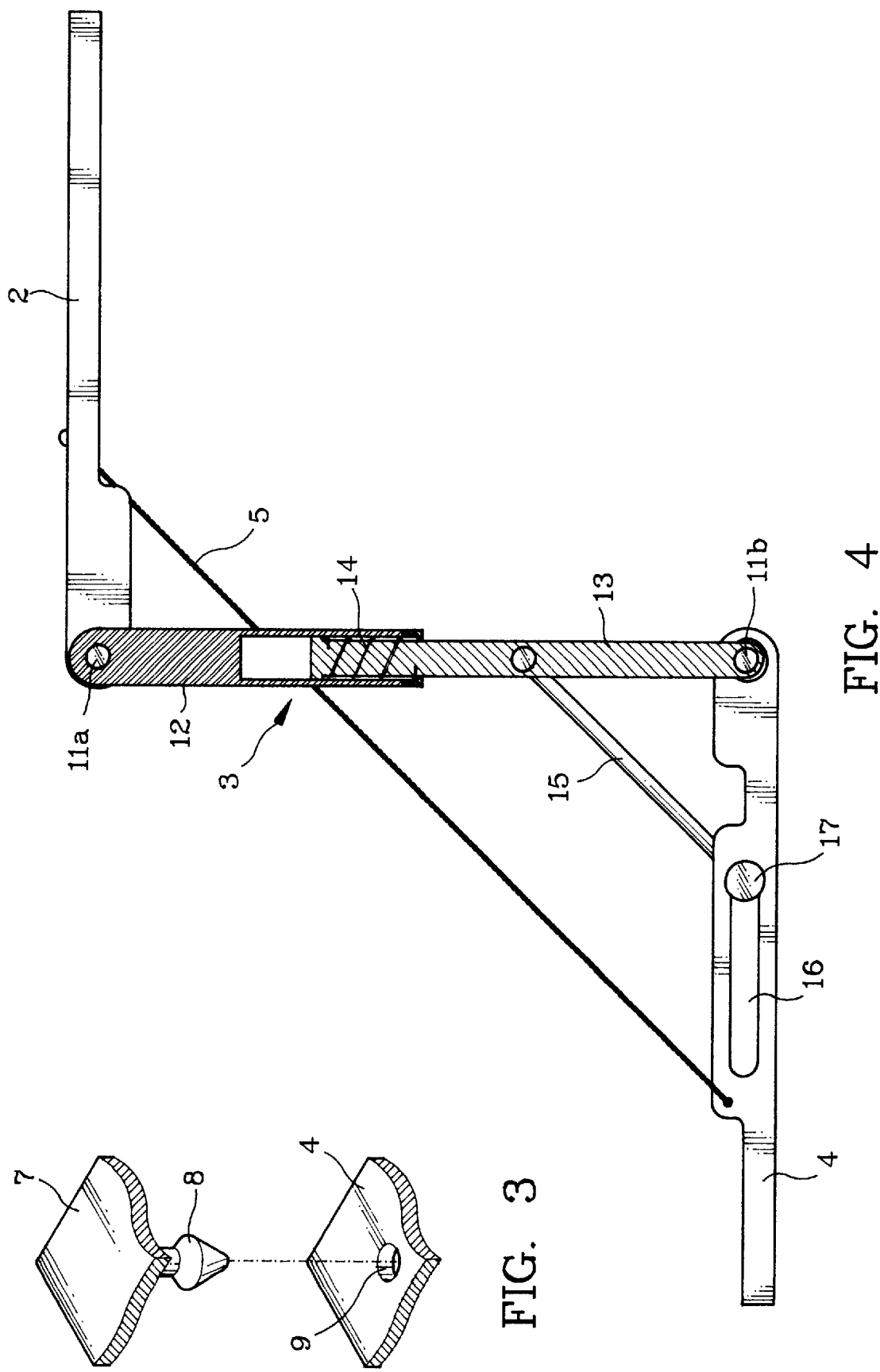

DIRT REMOVING RUNNING BOARD FOR AUTOMOBILE

BACKGROUND OF THE INVENTION

1. Field of the Invention

This invention relates to a dirt removing running board for automobile and particularly to a running board which enables a driver and passengers to remove dirts from the shoes before entering into the automobile so that the interior of the automobile may be kept clean.

2. Description of the Prior Art

It usually happens that when the driver and passengers enter into a car, the dirt and mud sticking to the shoes also could be carried into the car. Accumulation of these dirt and mud makes the inside of the car uncomfortable and not healthy. It is also very difficult and bothersome to clean. A general practice to prevent the dirt and mud from being carried into the car is to shake or stamp the feet before entering into the car. It is not very effective. It is also an awkward thing to do. Furthermore those mud and dirt are not easy for a car vacuum cleaner to clean thoroughly. It is also difficult to wash and clean by water inside a car. The best possibly way is to prevent the dirt and mud from entering into the car in the first place.

SUMMARY OF THE INVENTION

It is therefore an object of this invention to provide a dirt removing running board for automobile that enables the driver and passengers to remove the dirt and mud away from the shoes outside the car so that the inside of the car may be kept clean.

It is another object of this invention to provide a dirt removing running board which may be installed below a car door and may be easily extended for use and folded for storage when not in use.

It is a further object of this invention to provide a dirt removing running board for automobile that has a spring to adjust the height to suit different road conditions.

It is yet another object of this invention to provide a dirt removing running board for automobile that includes a moveable dirt panel to facilitate washing and cleaning.

BRIEF DESCRIPTION OF THE DRAWINGS

The invention, as well as its many advantages, may be further understood by the following detailed description and drawings in which:

FIG. 3 is a fragmentary cutaway view of a base frame and a dirt panel.

FIG. 4 is a sectional side view of a linkage means taken along line 111—111 of FIG. 1.

DETAILED DESCRIPTION OF THE PREFERRED EMBODIMENT

Figure 1:
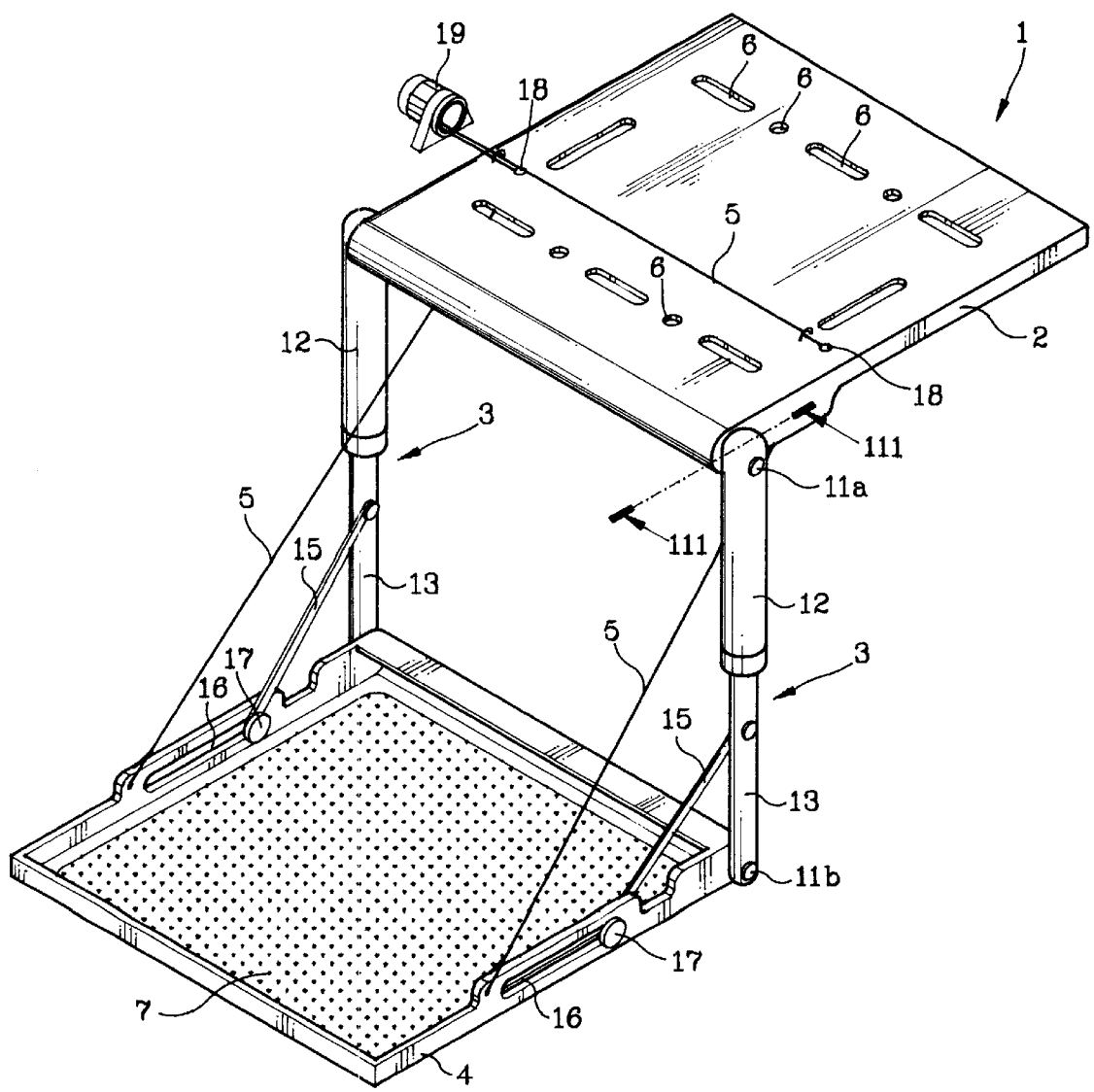
FIG. 1 is a perspective view of this invention at an extended state.
Figure 2:
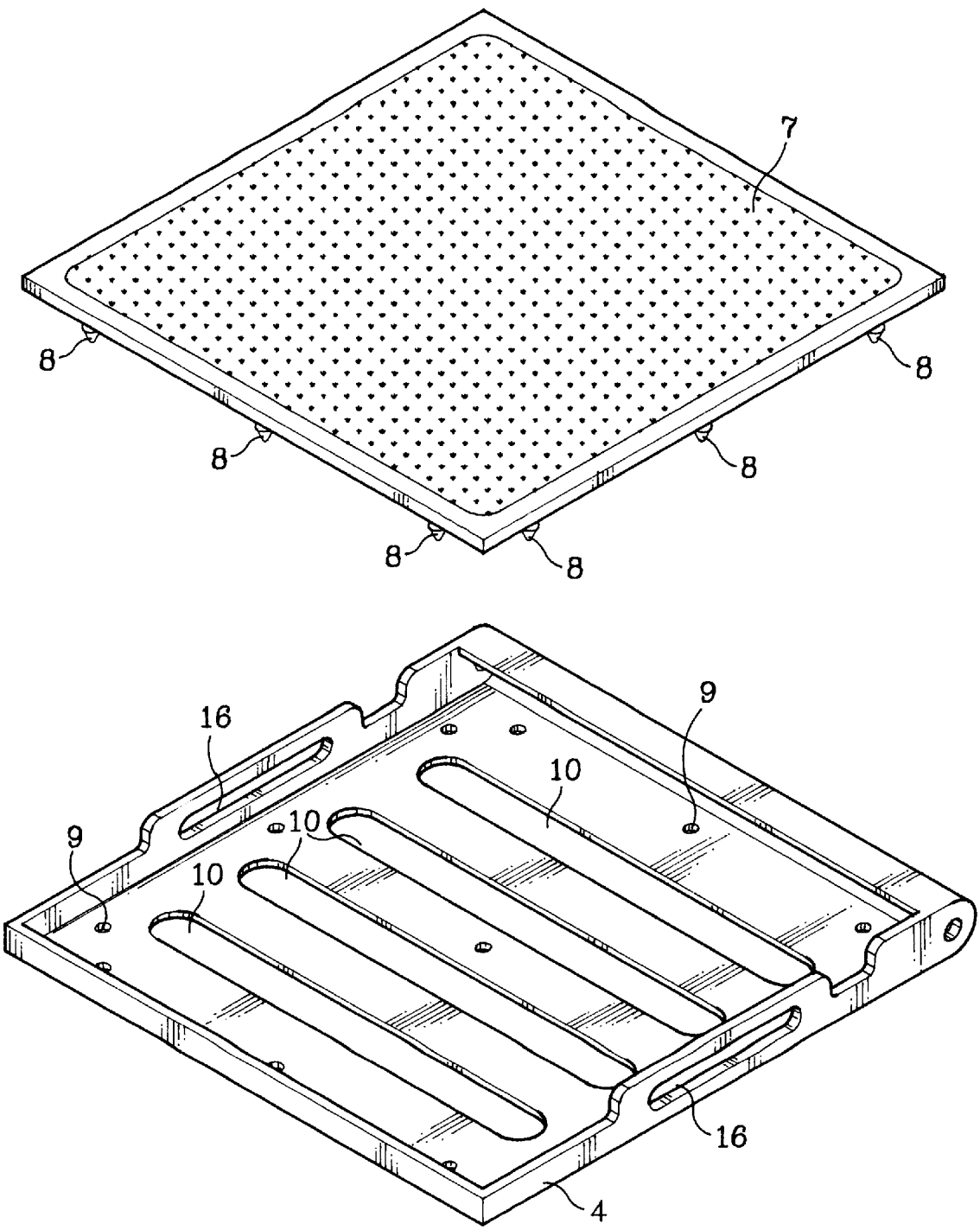
FIG. 2 is an exploded view of a base frame and a removable dirt panel of this invention.

Referring to FIGS. 1 and 2, the dirt removing running board 1 according to this invention includes a cover 2, a linkage means 3, a base frame 4 and a pair of steel wires 5. The cover 2 has a plurality of openings 6 for screwing the cover to the chassis 22 of a car 20 (shown in FIG. 6). Each of the two ends of the front edge of the cover 2 is pivotly engaged with a top end of an upper bar 12 of the linkage means 3 through a first bolt 11a. The linkage means 3 further has a lower bar 13 axially engages with a hollow lower portion of the upper bar 12 (also shown in FIG. 4) with a spring 14 set between them so that the lower bar 13 may be moved up or down when needed. The bottom end of the lower bar 13 is pivotly engaged with one end of the rear edge of the base frame 4 via a second bolt 11b.

The base frame 4 has a plurality of discharging slots 10 for discharging water. The base frame 4 further has upward side flanges. In two lateral side flanges, there are side slots 16 for engaging with a sliding end 17 of a pair of positioning bars 15. Another end of the positioning bar 15 is pivotly engaged with the lower bar 13. There is a dirt removing panel 7 which has a plurality mushroom-shaped studs 8 (shown in FIG. 3) below the bottom surface for engaging and resting on the apertures 9 formed in the base frame 4 (FIG. 2). Each steel wire 5 has one end fixed to a lateral side flange of the base frame, another end is running through a wire aperture 18 in the cover 2 and winding to a motor 19.

When in use, the motor 19 is activated to release the steel wire 18 so that the base frame 4 may be extended as shown in FIG. 1. The sliding end 17 of the positioning bar 15 is moved to one end of the side slot 16. Both the steel wire 5 and the positioning bar 15 hold the base frame 4 firmly. The base frame 4 is substantially perpendicular to the linkage means 3. The dirt removing panel 7 resting on the base frame 4 is ready to support user's foot and holds the dirts and muds shaking away from user's shoes. The dirt removing panel 7 may be removed easily from the base frame 4 for shaking off the dirts and muds outside the car or for washing. Thus dirts and muds from user's shoes may be prevented from carrying into the car.

Figure 5:
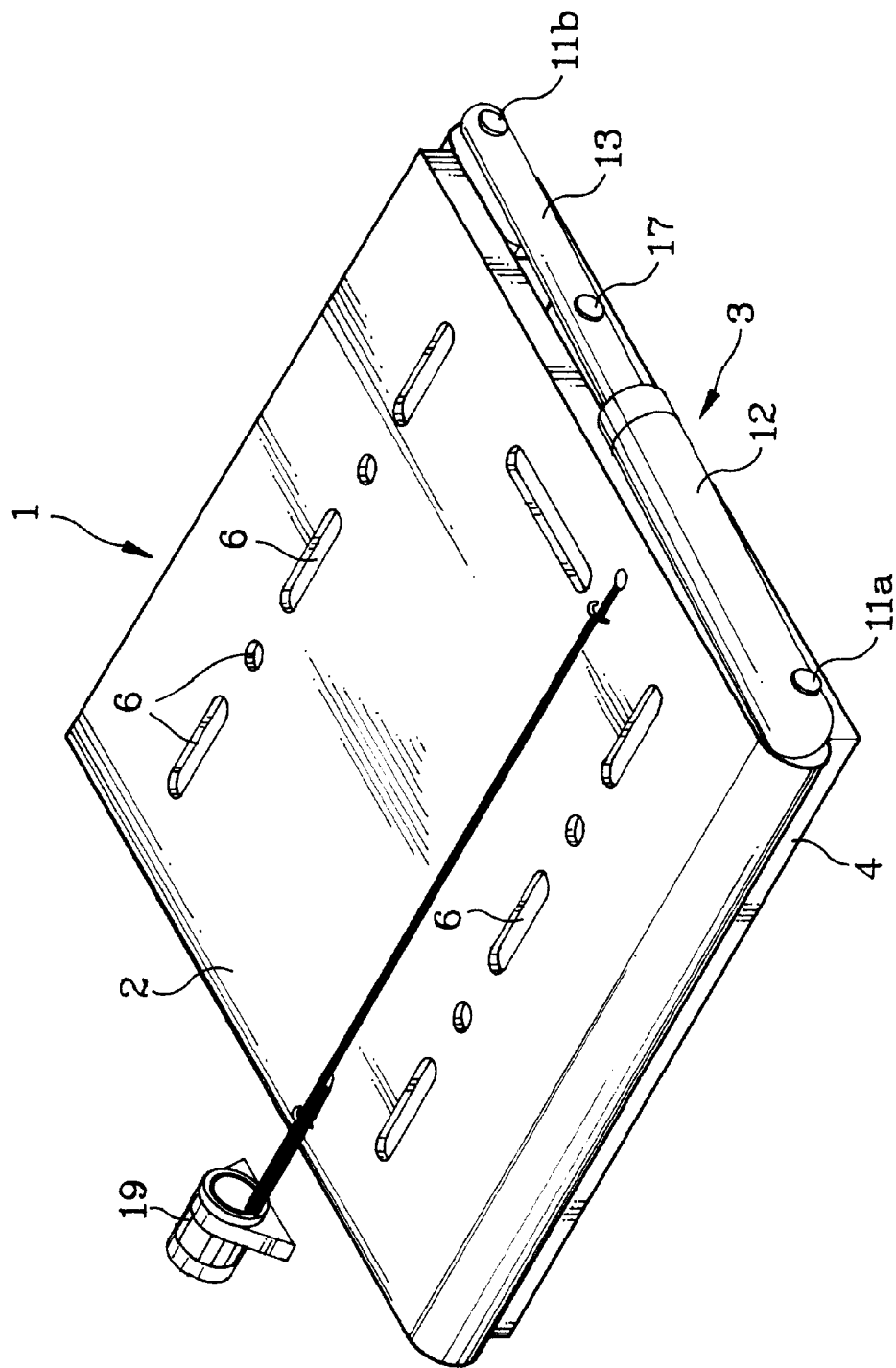
FIG. 5 is a perspective view of this invention at a folding state.

Referring to FIG. 5, when not in use, the motor 19 may be activated to rotate in the opposite direction to wind the steel wire 5. The base frame 4 may then be pulled and folded to the cover 2 to form a compact package under the chassis of the car for storage. At this position, the sliding end 17 of the positioning bar 15 is moved to another end of the side slot 16. A locking means (not shown in the figures) may be furnished between the cover 2 and the base frame 4 such that the base frame 4 can be locked with the cover 2 securely and safely when it is pulled and folded to the cover 2. When the motor 19 is activated to release the base frame 4, the locking means will also be unlocked automatically such that the base frame 4 can be extended freely.

Figure 6:
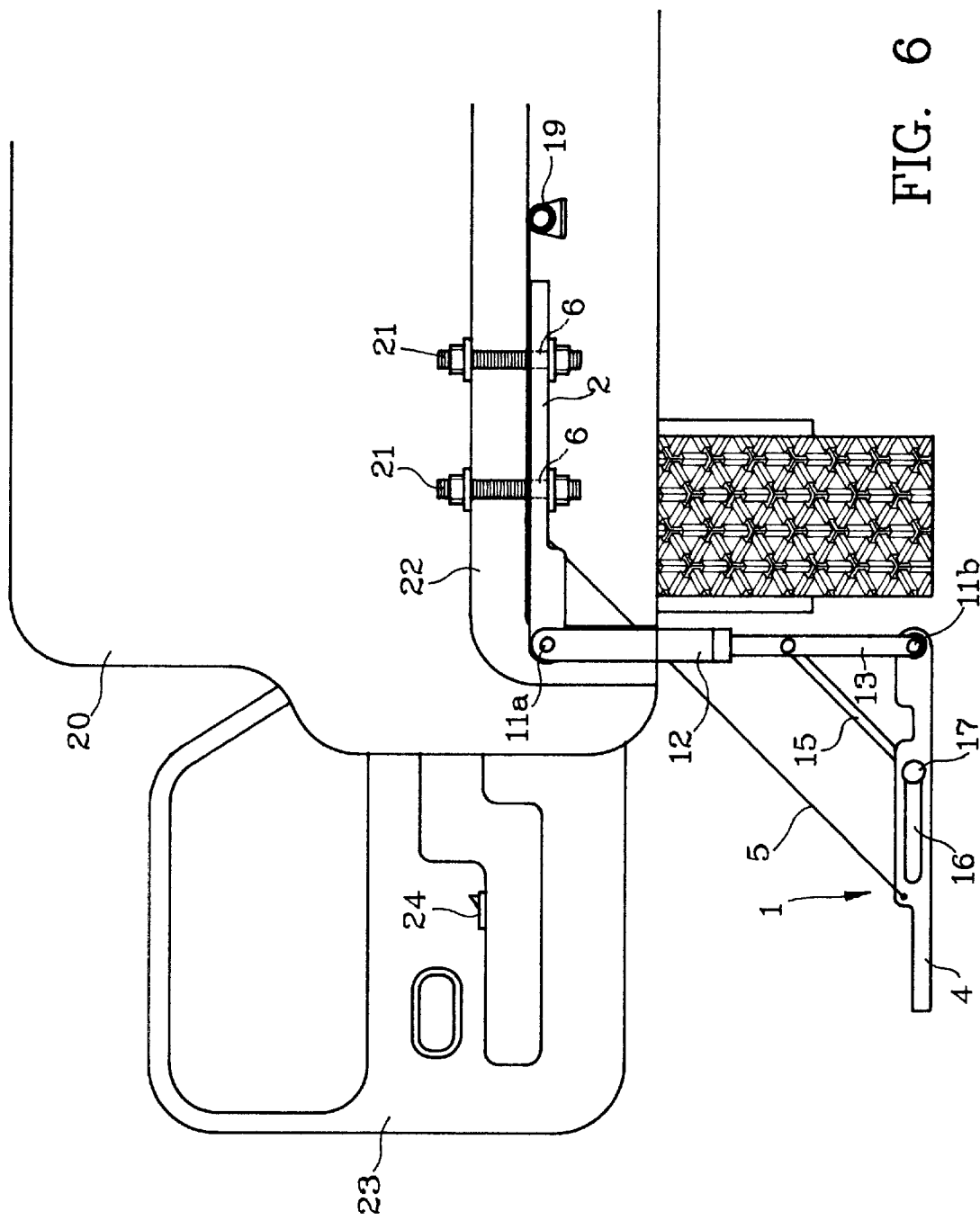
FIG. 6 is a pictorial view of this invention in use.

Referring to FIG. 6, this invention may be installed under a car door by screwing a bolt 21 through the cover 2 to the chassis 22 of the car 20. The spring 14 in the linkage means 3 allows the lower bar 13 be moved up or down to suit different road conditions. The motor 19 may be activated by means of a switch 24 located in a car door 23. Of course an automatic switch may also be installed in the car 20 so that when the door 23 is opened, the motor 19 will be activated automatically to unfold and extend the base frame 4 for use. When the door 23 is closed, the motor 19 will be actuated to wind the steel wire 5 for folding the base frame in the cover 2 for storage.

Figure 7:
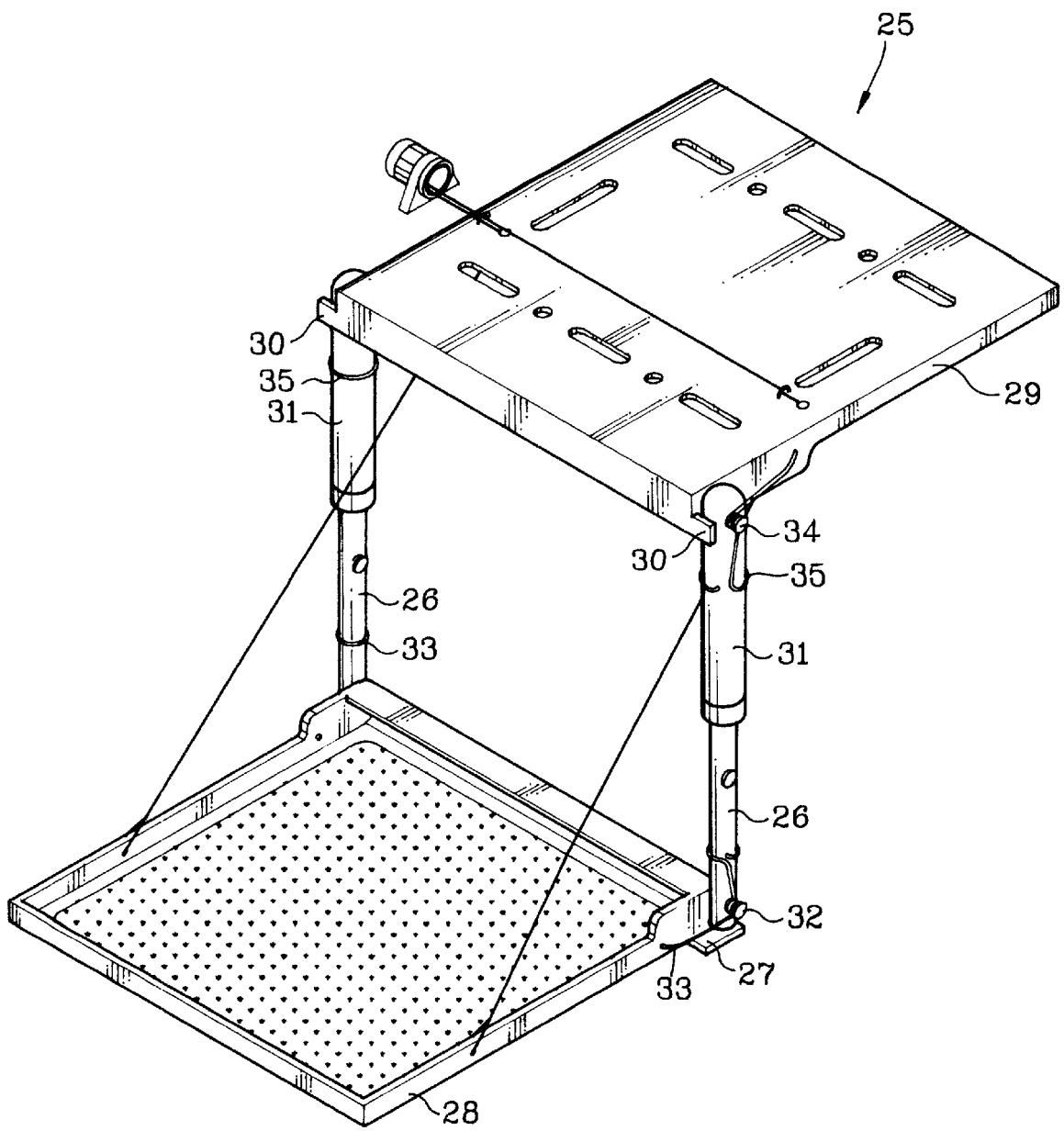
FIG. 7 is a perspective view of another embodiment of this invention.
Figure 8:
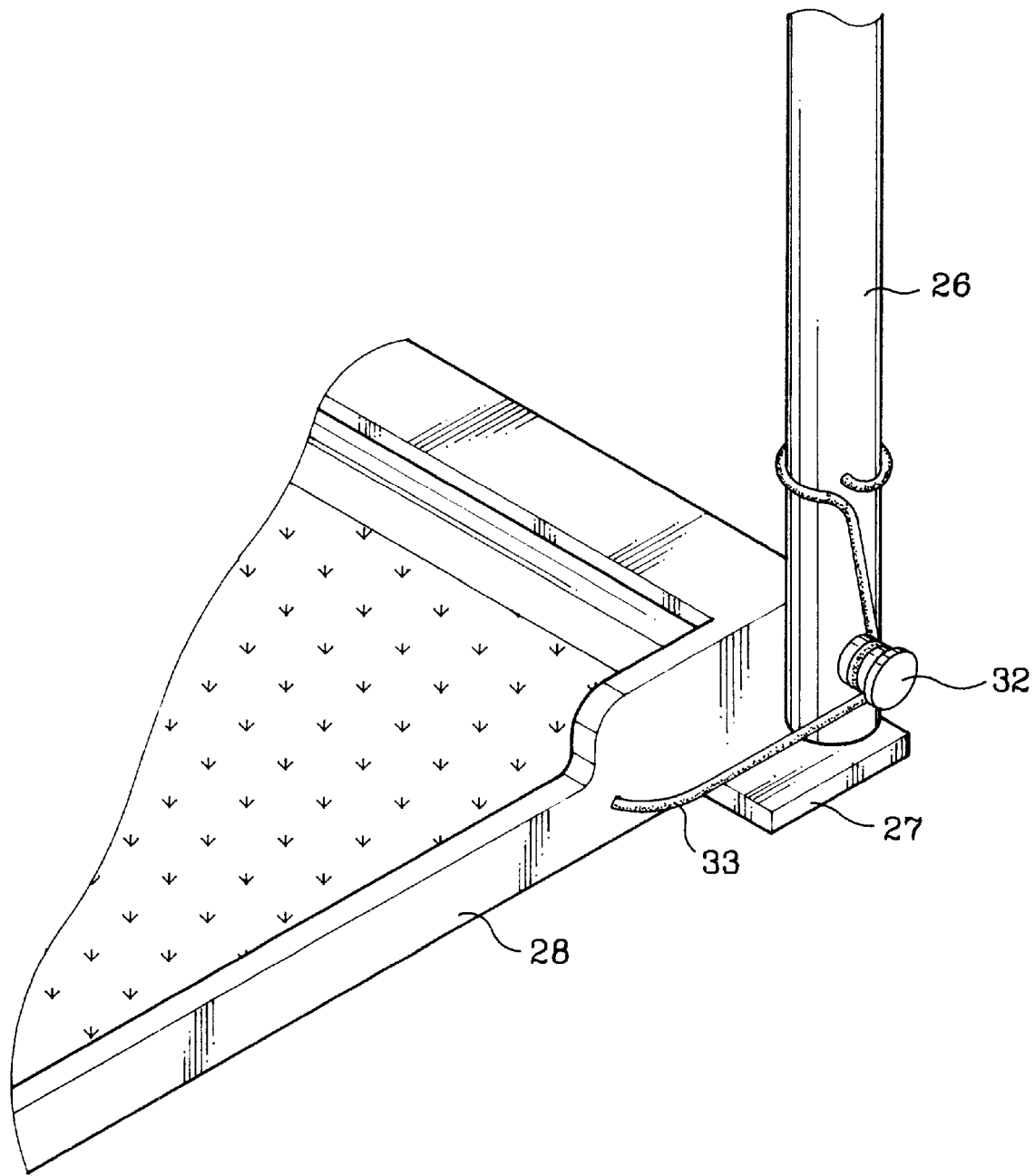
FIG. 8 is a fragmentary perspective view of the embodiment shown in FIG. 7.

FIG. 7 and FIG. 8 illustrate another embodiment of this invention. It is generally structured like the one shown in FIG. 1 except that there are no positioning bars 15 or side slots 16. However at the bottom end of the lower bar 26, there is provided with a horizontal supporting plank 27 for holding the base frame 28 at a horizontal position when in use. There is also a first torsional spring 33 pivotly held by a first pivot stud 32. The first torsional spring 33 has one end engaged with the base frame 28 while another end engaged with the lower bar 26. When the base frame 28 is folded, the spring 33 will be compressed. The compressing force of the spring 33 may later be released to make the unfolding and extending of the base frame 28 more easily. Same principle may also be applied to the cover 29 which has a guarding plank 30 vertically disposed at a front end of the cover 29 for holding the upper bar 31 at vertical position when extended. At the top end of the upper linking bar 31, there is a second torsional spring 35 pivotly held by a second pivot stud 34. So that the compression force applied to the spring 35 during the folding movement may be released later during the unfolding movement to make the extending the linkage means more easily.

Figure 9:
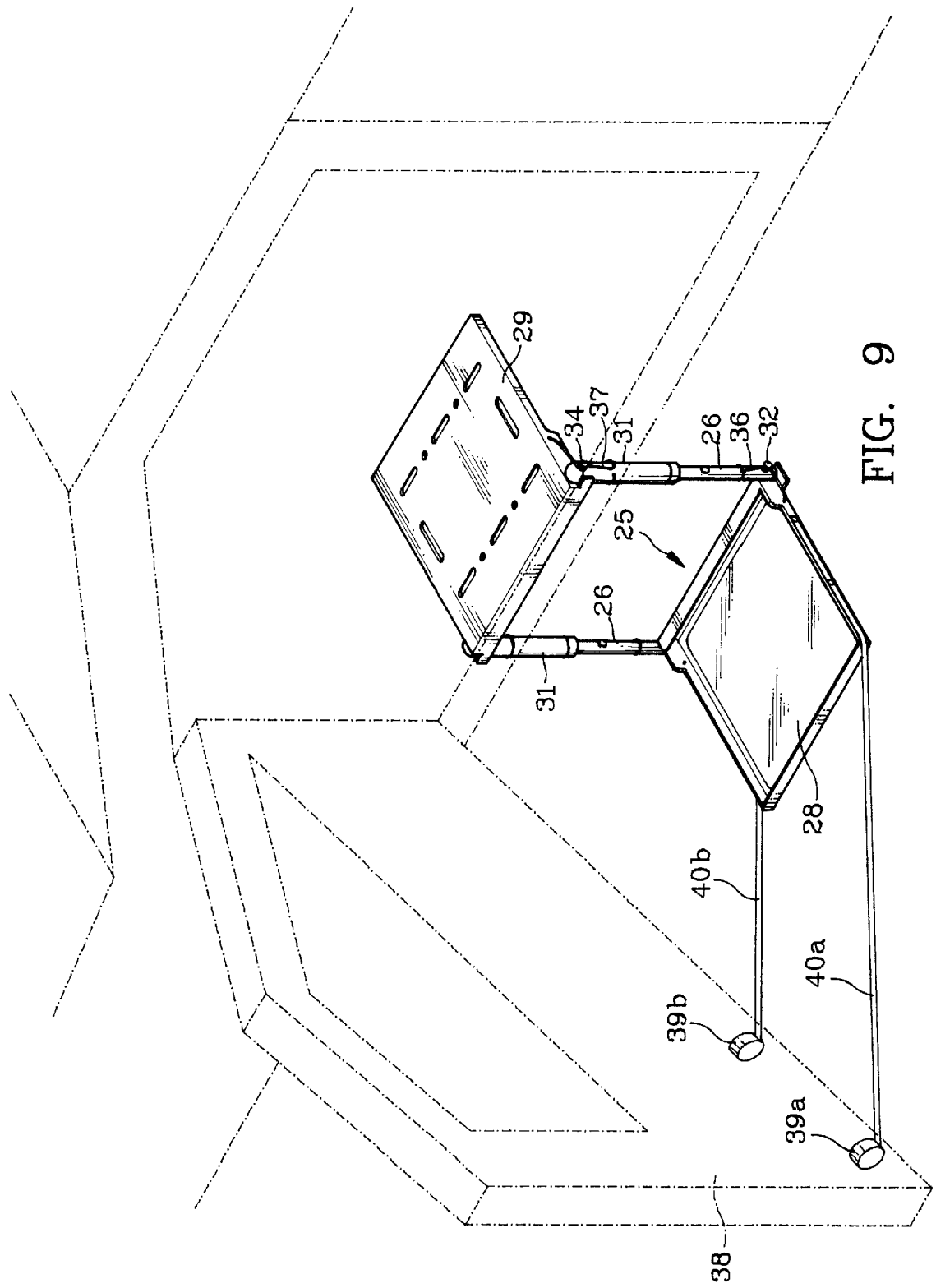
FIG. 9 is a further embodiment of this invention in use.

FIG. 9 illustrates a further embodiment of this invention. The dirt removing running board 25 according to this embodiment does not have the steel wire 5 or motor 19 like aforesaid embodiments. On the lower bar 26, there is a first pivot stud 32 upon which a first torsional spring 36 is mounted thereon. One end of the spring 36 engages with the base frame 28 while another end engages with the lower bar 26. Therefore when the base frame 28 is unfolded and extended, the torsional spring 36 is stretched and has a spring force to close and fold the base frame 28 toward the linkage means when external force on the base frame is absent. Similar structure is applied to the upper bar 31 and the cover 29 where a second torsional spring 37 mounted on a second pivot stud 34 will exert a torsional force to fold the upper bar 31 toward the cover 29 when this invention is not in use. Furthermore, in the car door 38, there may be provided with two reel spring sets 39a, and 39b. The free ends of the reel springs 40a and 40b engage with the base frame 28. The length of the stretched reel springs 40a and 40b is about 60–100 cm. When the car door 38 is opened, the reel springs 40a and 40b will be pulled out and exert a pulling force on the base frame 28 to open and extend the base frame 28 for use. This is to offset the strong torisonal force of the torsional springs 36 and 37 which will fold the base frame 28 to the cover 29 when external force is absent. When the base frame 28 is folded and retracted to the cover 29, and the car door 38 is closed, the reel springs 40a and 40b will be retracted into the reel spring sets 39a and 39b. This embodiment use mechanical means to open or close the running board of this invention automatically by means of the opening or closing of car door, therefore it is dispensed with the motor and control circuit used in the previous embodiments set forth above. It is simpler structured and costs less. It may also be adapted to a wide variety of motor vehicles.

It may thus be seen that the objects of the present invention set forth herein, as well as those made apparent from the foregoing description, are efficiently attained. While the preferred embodiments of the invention have been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A dirt removing running board for automobile, said dirt removing running board comprising:

a cover having a plurality of openings for screwing the cover to the automobile fixedly;

a linkage means comprising an upper bar with a top end pivotly engaging with one end of the cover and having a hollow lower portion, a lower bar with an upper portion thereof axially housed in the hollow portion of the upper bar, and a spring housed in the hollow portion and between the upper bar and the lower bar;

a base frame pivotly engaged at one end thereof with a bottom end of the lower bar having two lateral upward flanges, a positioning bar, a plurality of water discharging slots, and a removable dirt removing panel located thereon;

the positioning bar having one end pivotly engaged with the lower bar and another end slidably engaged with a slot formed in the lateral upward flange; and a pair of spaced steel wires each having one end fixed to a lateral flange of the base frame and another end running through an aperture in the cover and winding to a motor;

wherein motor rotation in one direction will release the base frame to an extended position with the base frame substantially perpendicular to the linkage means;

wherein motor rotation in an opposite direction will retract the steel wire to fold the base frame and the linkage means to the cover to form a compact size.

2. A dirt removing board of claim 1, wherein the spring will move the lower bar up or down to suit different road conditions.

3. A dirt removing board of claim 1 further having a switch located in the automobile for controlling the motor.

4. A dirt removing board of claim 1 further having a horizontal supporting plank located at the bottom end of the lower bar and a vertical guarding plank located at one end of the cover adjacent the top end of the upper bar so that the linkage means will be perpendicular to the base frame and the cover when at extending position.

5. A dirt removing board of claim 1, wherein the dirt removing panel has a plurality of mushroom-shaped studs located under the bottom surface thereof for engaging with and resting on apertures formed in the base frame.

6. A dirt removing board of claim 1 further having a first pivot stud at the lower bar with a first torsional spring mounted thereon and a second pivot stud at the upper bar with a second torsional spring mounted therein;

the first torisonal spring having one end engaged with the base frame and another end engaged with the lower bar, the second torsional spring having one end engaged with the cover and another end engaged with the upper bar for extending the linkage means and the base frame when in use.

7. A dirt removing running board for automobile, comprising:

a cover having a plurality of openings for screwing the cover to the automobile;

a linkage means including an upper bar with a top end pivotly engaging with one end of the cover and having a hollow lower portion, a lower bar with an upper portion thereof axially housed in the hollow portion of the upper bar, and a spring housed in the hollow portion and between the upper bar and the lower bar;

a base frame pivotly engaged at one end thereof with a bottom end of the lower bar having a plurality of water discharging slots and a removable dirt removing panel located thereon;

a pair of spaced reel spring sets located in a car door, each reel spring having one end engaged with the base frame for pulling and extending the base frame for use when the car door is being opened;

a first torsional spring pivotly mounted at a bottom end of the lower bar thereof for folding the base frame when not in use; and a second torsional spring pivotly mounted at a top end of the upper bar for retracting and folding the linkage means and the base frame to the cover when not in use.

* * * * *